United States Patent
Kawai et al.

(10) Patent No.: US 7,005,992 B2
(45) Date of Patent: Feb. 28, 2006

(54) TEMPERATURE MONITOR FOR ELECTRO-MECHANICAL PART

(75) Inventors: Sigekazu Kawai, Gunma (JP); Hiroyuki Kuribara, Saitama (JP); Tsutomu Ishikura, Gunma (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 14 days.

(21) Appl. No.: 10/451,829

(22) PCT Filed: Dec. 17, 2001

(86) PCT No.: PCT/JP01/11019

§ 371 (c)(1), (2), (4) Date: Jun. 26, 2003

(87) PCT Pub. No.: WO02/054029

PCT Pub. Date: Jul. 11, 2002

(65) Prior Publication Data

US 2004/0052294 A1 Mar. 18, 2004

(30) Foreign Application Priority Data

Dec. 27, 2000 (JP) ............................ 2000-398294

(51) Int. Cl.
*G08B 17/00* (2006.01)

(52) U.S. Cl. .................. 340/588; 702/130; 702/132

(58) Field of Classification Search ............... 340/588, 340/635, 693.5, 870.17; 374/25; 116/101, 116/216; 702/130, 132, 133, 134, 136
See application file for complete search history.

(56) References Cited

U.S. PATENT DOCUMENTS

| | | | | |
|---|---|---|---|---|
| 3,748,655 A | * | 7/1973 | Engelhardt et al. | 340/870.11 |
| 4,635,055 A | * | 1/1987 | Fernandes et al. | 340/870.17 |
| 4,855,671 A | * | 8/1989 | Fernandes | 324/127 |
| 4,901,060 A | * | 2/1990 | Liu | 340/598 |
| 4,970,496 A | * | 11/1990 | Kirkpatrick | 340/585 |
| 5,029,101 A | * | 7/1991 | Fernandes | 702/62 |
| 5,140,257 A | * | 8/1992 | Davis | 324/106 |
| 5,430,433 A | * | 7/1995 | Shima | 340/539.26 |
| 5,515,266 A | * | 5/1996 | Meyer | 700/79 |
| 5,525,976 A | * | 6/1996 | Balgard | 340/870.17 |
| 5,774,784 A | * | 6/1998 | Ohno | 455/343.2 |
| 5,886,738 A | * | 3/1999 | Hollenbeck et al. | 348/151 |
| 6,326,892 B1 | * | 12/2001 | De La Forterie | 340/588 |
| 6,349,268 B1 | * | 2/2002 | Ketonen et al. | 702/130 |
| 6,429,777 B1 | * | 8/2002 | Boyden | 340/584 |

FOREIGN PATENT DOCUMENTS

| | | |
|---|---|---|
| JP | 63-36116 | 2/1988 |
| JP | 63-235837 | 9/1988 |
| JP | 3-48736 | 5/1991 |
| JP | 3-107724 | 5/1991 |
| JP | 4-138038 | 5/1992 |
| JP | 5-66714 | 3/1993 |
| JP | 6-221732 | 8/1994 |
| JP | 10-162280 | 6/1998 |

* cited by examiner

Primary Examiner—Jeffery Hofsass
Assistant Examiner—Jennifer Stone
(74) Attorney, Agent, or Firm—McGinn IP Law Group, PLLC

(57) ABSTRACT

A temperature monitor includes a temperature sensor, a transmitter, and a controller. The temperature sensor generates a temperature signal based upon a detected temperature and the controller controls the temperature sensor to generate the temperature signal and controls the transmitter to transmit the temperature signal along with a time at a first predetermined interval.

3 Claims, 9 Drawing Sheets

FIG.1
PRIOR ART (a)
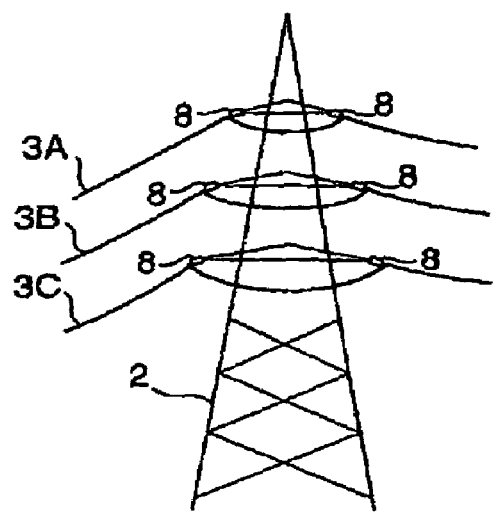
PRIOR ART (b)
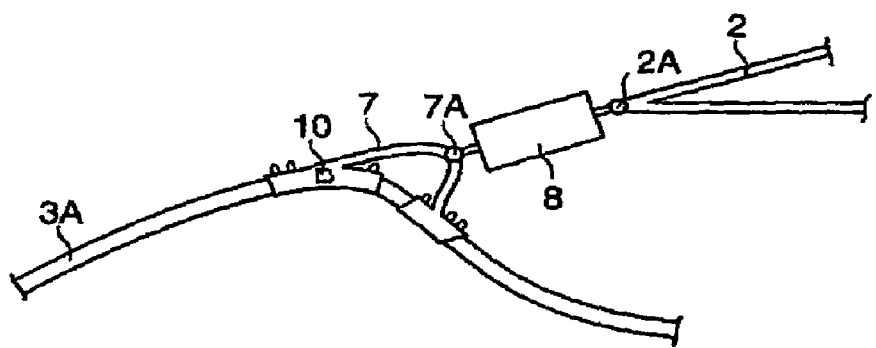
PRIOR ART (c)
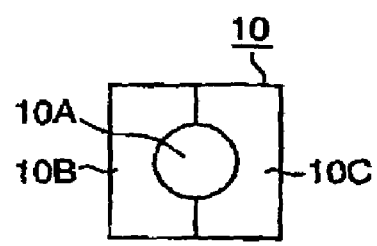

FIG.4
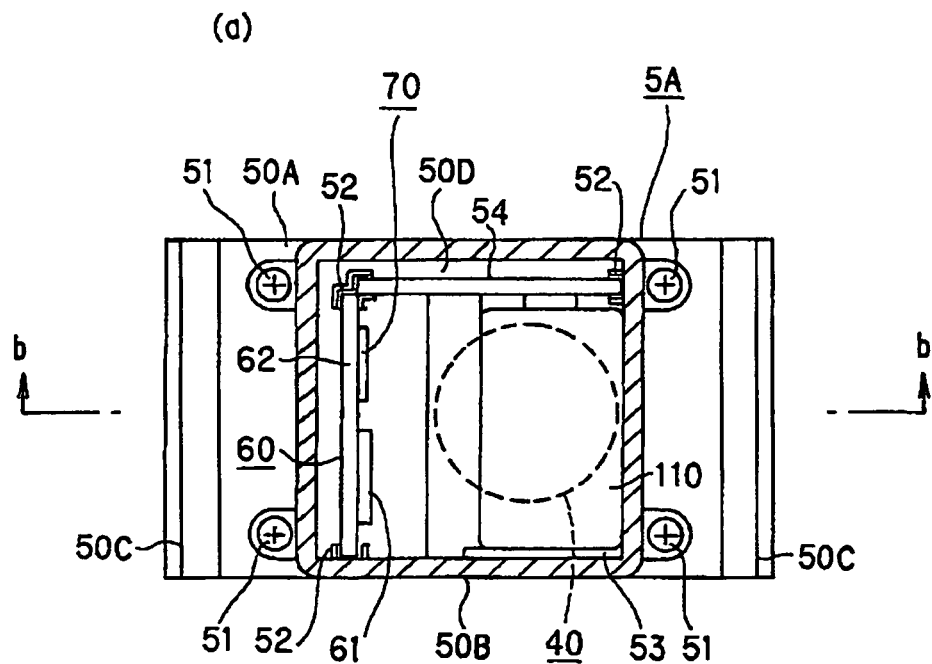
(a)
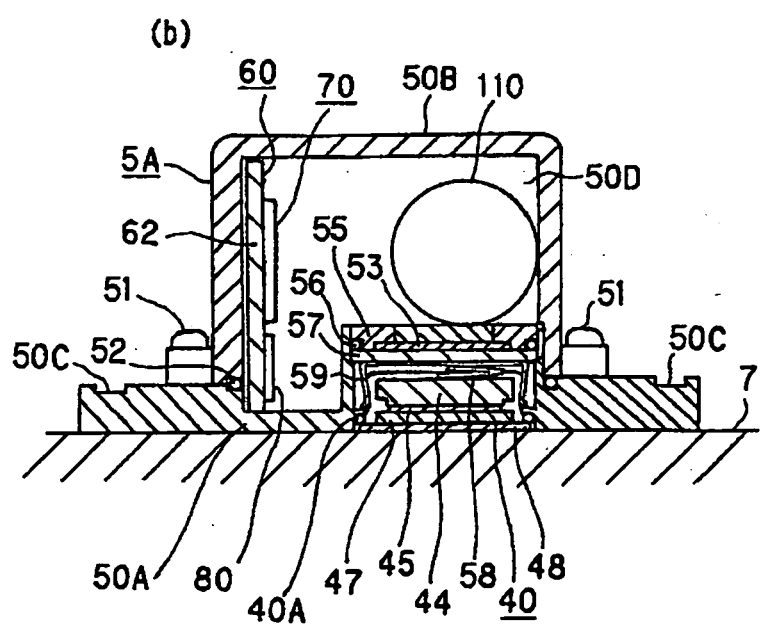
(b)

FIG.5
(a)
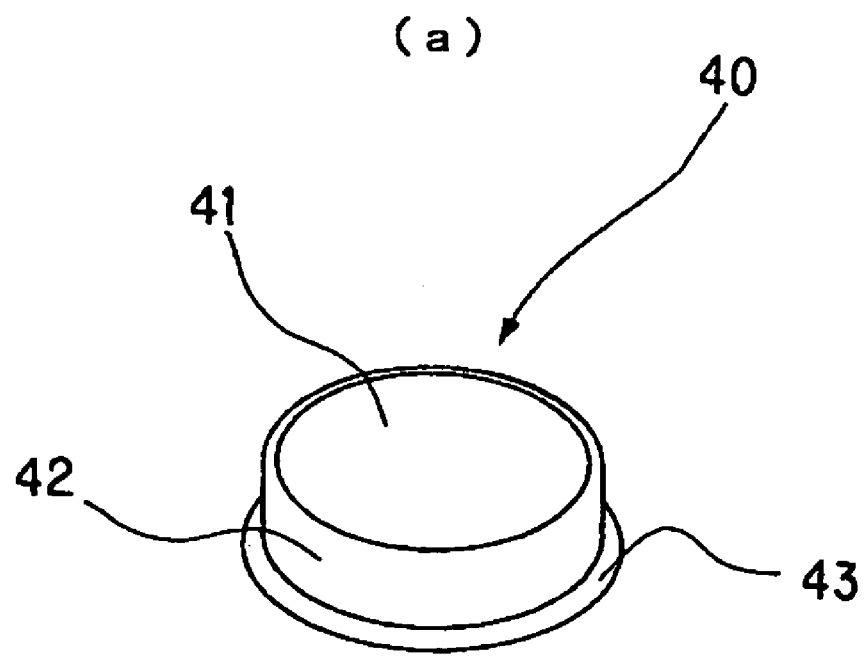
(b)
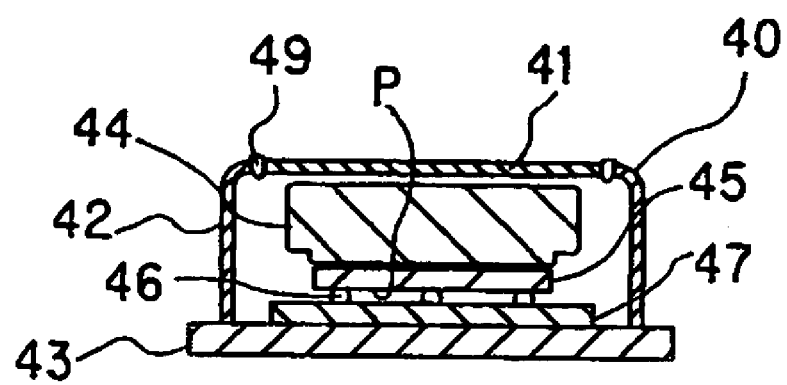

FIG.8
(a)
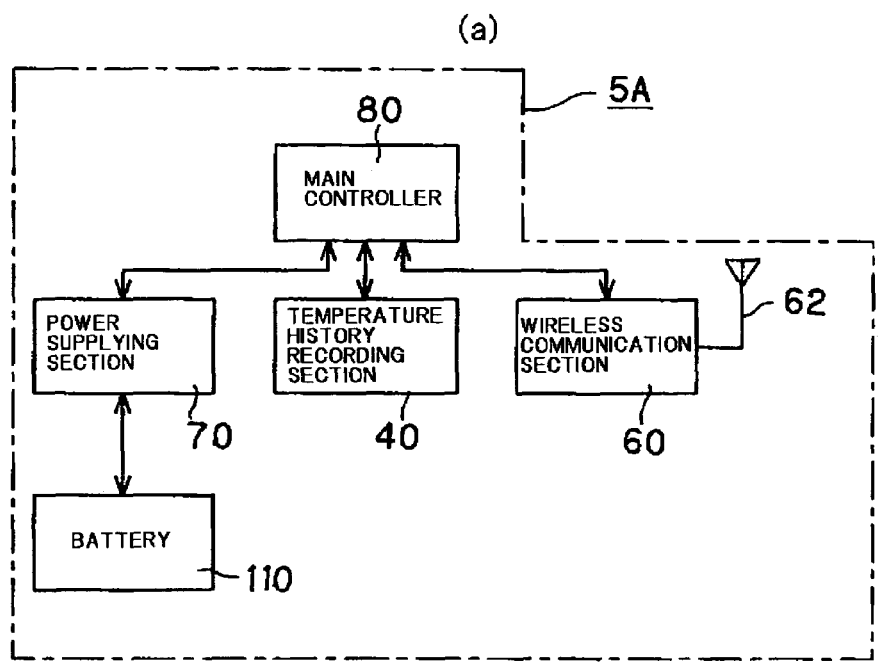
(b)
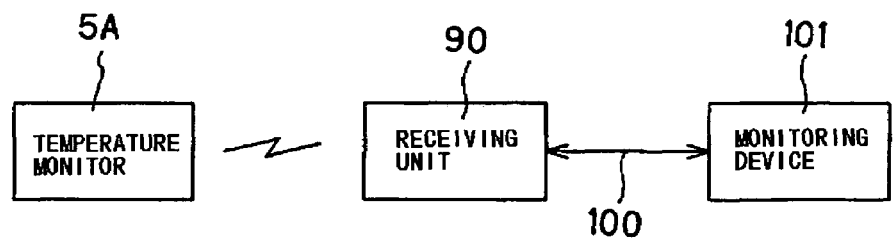

FIG.9
(a)
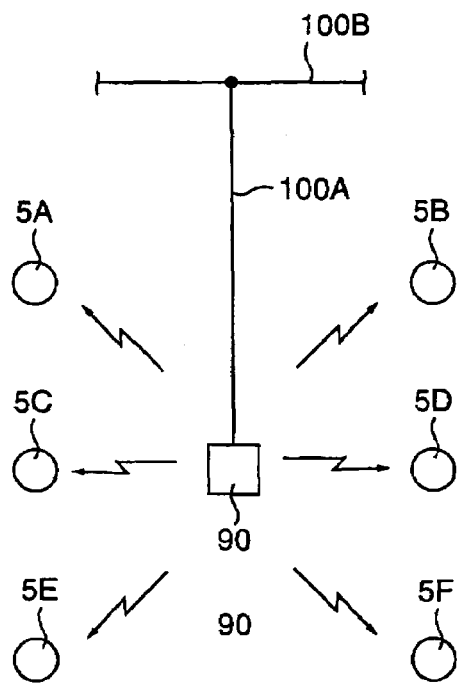
(b)
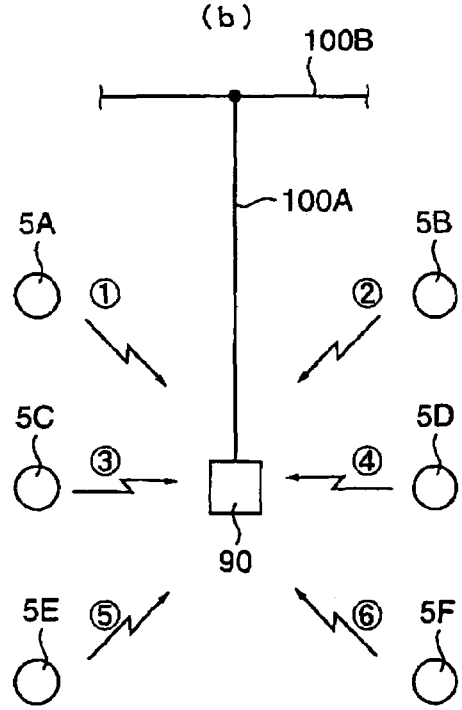

TEMPERATURE MONITOR FOR ELECTRO-MECHANICAL PART

This application is based on Japanese patent application No.2000-398294, the entire contents of which are incorporated herein by reference.

TECHNICAL FIELD

This invention relates to a temperature monitoring system for electric power-applied section and particularly to a temperature monitoring system for electric power-applied section that can safely and easily monitor the temperature change of electric power-applied section without incurring an accident such as electric shock.

BACKGROUND ART

Conventionally, to main circuit connection of transformer station and electric power-applied section of high-voltage cable, a thermo-sensing label is attached such that its color changes to indicate that a state of exceeding a predetermined temperature continues for a certain period for the purpose of constantly supplying electric power, thereby allowing the maintenance worker to visually monitor it.

FIGS. 1(a) to (c) show a conventional structure for supporting the transmission line at a power transmission tower. FIG. 1(a) shows a schematic composition of the power transmission tower. FIG. 1(b) shows a support portion for the transmission line. The power transmission tower 2 is composed of cable supporting portions 2A to support the transmission lines 3A, 3B and 3C, and insulators 8 that are connected to the top of the cable supporting portions 2A to suspend the transmission lines 3A, 3B and 3C while insulating from the lines. The cable clamp 7 attached to each of the transmission lines 3A, 3B and 3C is fixed to the insulator 8 to support each of the transmission lines 3A, 3B and 3C. The thermo-sensing label is attached on the surface of the cable clamp 7.

FIG. (c) shows the thermo-sensing label 10, which includes a temperature indicating section 10A that is of a thermo-sensitive material whose color changes according to temperature, and temperature index sections 10B (red [higher than 65° C.]) and 10C (yellow[higher than 50° C.]) that indicate the relation of color indicated by the temperature indicating section 10A and the temperature. The temperature indicating section 10A has irreversibility that the state of having the color once changed is retained. For example, when the temperature of cable clamp 7 is kept higher than 65° C. for a certain time due to electrical overload, its color changes to red and after that the color changing state is retained. Therefore, when it is found in the maintenance check that the thermo-sensing label 10 has the color changed, it can be visually and easily checked that the cable clamp 7 reached a high temperature. An increase in temperature of the cable clamp 7 can be caused by loosing of a bolt, deterioration of a cable, increasing of load due to an increase in amount of current carried.

Japanese patent application laid-open No.5-66714 discloses a thermo-sensing label that has a temperature indicating section of a thermo-sensitive material with reversibility. In the thermo-sensing label, the transparency of the thermo-sensitive material varies between transparent and white opaque depending on temperature, and the thermo-sensitive material has reversibility in transparency. Therefore, the thermo-sensing label can be used repeatedly.

However, in the conventional temperature monitoring system using the thermo-sensing label, there is a problem that even when a periodical temperature change not reaching the extraordinary temperature occurs at the electric power-applied section due to an increase in amount of current carried, it cannot be detected since the system is designed to detect that its-monitored object reaches an extraordinary temperature.

Also, in the conventional temperature monitoring system, it is necessary to visually check the color change of temperature indicating section. Therefore, in such a place that cannot be easily accessed by the maintenance worker for safety reasons, the object to be monitored will be subject to limitations. When remote monitoring by a camera etc. is employed instead of visually checking, it will be costly.

It is an object of the invention to provide a temperature monitoring system for electric power-applied section that can safely and at low cost monitor a temperature change of electric power-applied section without having a monitored object limited and obtain a temperature history record according to a situation of monitored object.

DISCLOSUR OF INVENTION

According to the invention, a temperature recording device having a memory to store a temperature record based on measurements of temperature sensor is attached to an electric power-applied section, e.g., main circuit connection or high-voltage cable. This temperature recording device conducts a measurement of temperature at predetermined intervals and transmits, at predetermined intervals, a temperature record obtained by the measurement through wireless communication to a monitoring device. Thus, it can be rapidly detected that the electric power-applied section reaches an extraordinary temperature.

BRIEF DESCRIPTION OF DRAWINGS

FIGS. 1(a) to (c) show a schematic composition of conventional temperature monitoring system for electric power-applied section.

FIG. 4(a) is a broken top view showing the temperature monitor 5A in the preferred embodiment of the invention.

FIG. 4(b) is a cross sectional view cut along the line b—b in FIG. 4(a).

FIG. 5(a) is a perspective view showing a temperature history recording unit 40 in the preferred embodiment of the invention.

FIG. 5(b) is a cross sectional view showing the temperature history recording unit 40 in FIG. 5(a).

FIG. 8(a) is a control block diagram showing the temperature monitor 5A in the preferred embodiment of the invention.

FIG. 8(b) illustrates a signal transmission system between the temperature monitor 5A and a monitoring device 101 in the preferred embodiment of the invention.

FIG. 9(a) illustrates a transmit request operation from a receiving unit 90 in the preferred embodiment of the invention.

FIG. 9(b) illustrates a transmit operation of temperature history record from the respective temperature monitors 5A to 5F in the preferred embodiment of the invention.

BEST MODE FOR CARRYING OUT THE INVENTION

Temperature monitoring system for electric power-applied section of the invention is explained below in reference to the drawings.

Figure 2:
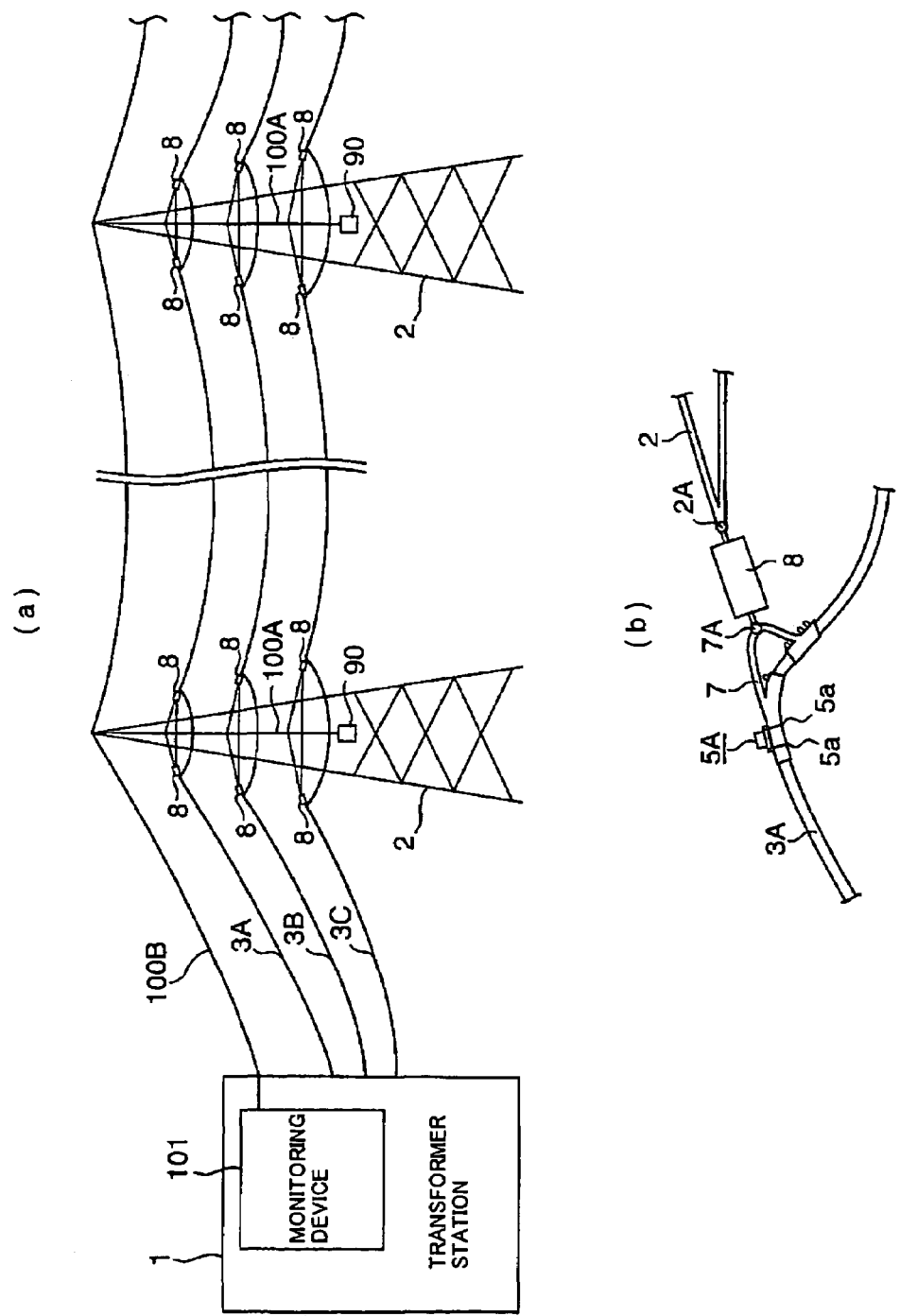
FIGS. 2(a) and (b) show a schematic composition of temperature monitoring system for electric power-applied section in a preferred embodiment of the invention.

FIG. 2 shows an electric power-applied section in a preferred embodiment of the invention, FIG. 2(a) shows the schematic composition of a power transmission system, and FIG. 2(b) is an enlarged view showing a temperature monitor 5A installed on a power transmission line 3A. The power transmission system includes: a transformer station 1 that supplies electric power; power transmission lines 3A, 3B and 3C that are wired through a power transmission tower 2; an optical ground wire (OPGW) 100B, insulators 8 that suspend the power transmission lines 3A, 3B and 3C to the power transmission tower 2 while insulating them from the tower; temperature monitors 5A, 5B, 5C, 5D, 5E and 5F that are installed on the power transmission lines 3A, 3B and 3C to detect the temperature, recording it as a record of temperature history (hereinafter referred to as "temperature history record") as well as its measurement time to a temperature history recording section described later and sending the temperature history record through radio wave; a receiving unit 90 that communicates through radio wave with the temperature monitors 5A, 5B, 5C, 5D, 5E and 5F; a signal line 100A that connects the OPGW 100B to the receiving unit 90; and a monitoring device 101 that analyzes the temperature of power transmission lines 3A, 3B and 3C based on the temperature history record to be inputted through the OPGW 100B.

The temperature monitor 5A is attached through an attachment 5a to a cable clamp 7 to suspend the power transmission line 3A to the power transmission tower 2. The cable clamp 7 is supported, through the insulator 8 connected to an insulator connecting portion 7A, by a cable supporting portion 2A of the power transmission tower 2. The other temperature monitors 5B, 5C, 5D, 5E and 5F are, in like manner, attached to the power transmission lines 3A, 3B and 3C.

Figure 3:
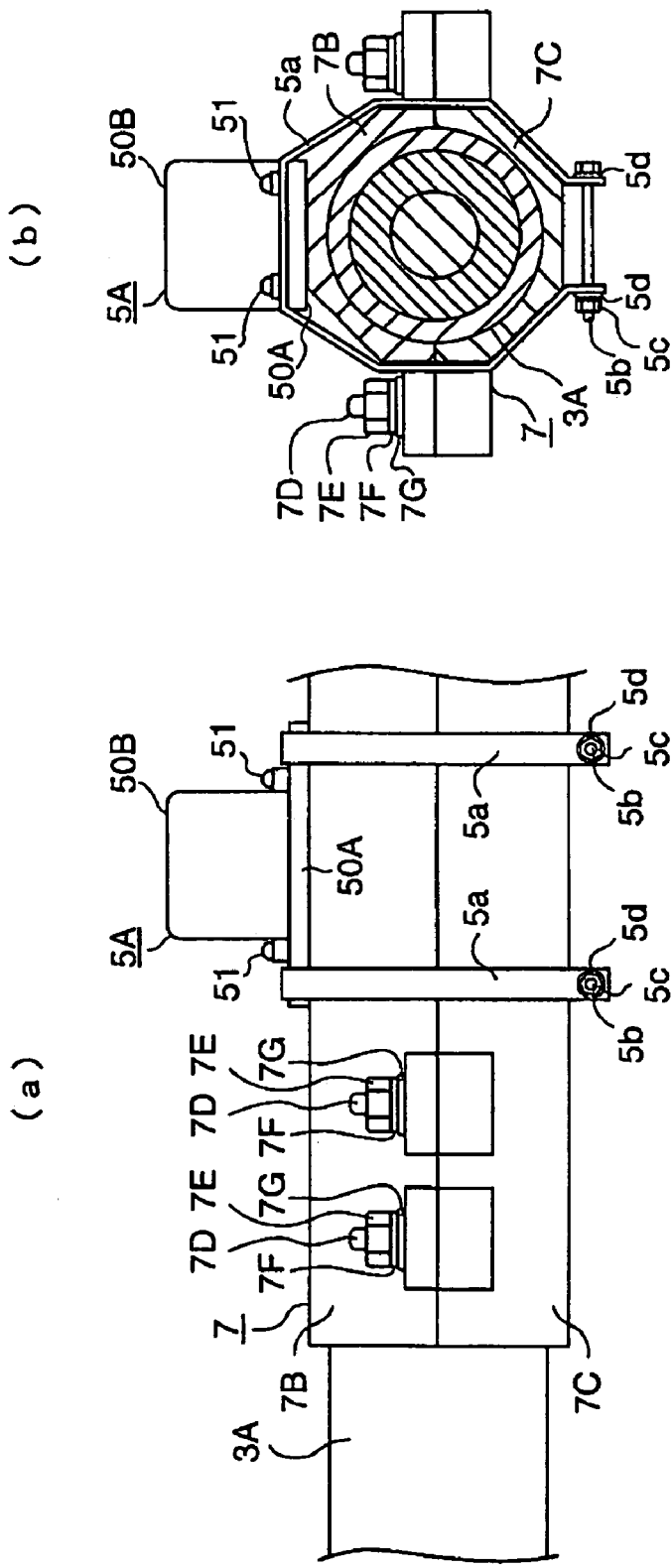
FIGS. 3(a) and (b) are enlarged views showing the installation of a temperature monitor 5A in a preferred embodiment of the invention.

FIG. 3 is an enlarged view of the cable clamp 7, where (a) is viewed from the side and (b) is viewed in the longitudinal direction of the power transmission line 3A. The cable clamp 7 is fixed to the power transmission line 3A by fastening clamp members 7B and 7C, which are of metal such as aluminum, by bolts 7D, nuts 7E, spring washers 7F and washers 7G. The attachment 5a fixes the temperature monitor 5A onto the periphery of the cable clamp 7 by using bolts 5b, nuts 5c and washers 5d.

FIG. 4 is an enlarged view of the temperature monitor 5A, where (a) shows its internal structure viewed from the top and (b) shows the internal structure cut along the line b—b in (a). In this embodiment, only the temperature monitor 5A is explained below, while the other temperature monitors 5B, 5C, 5D, 5E and 5F have the same structure as 5A. Meanwhile, for convenience of explanation, FIG. 4(a) shows a watertight section 50D with the top being opened, although it exactly accommodates a wireless communication section etc.

The temperature monitor 5A is composed of a base 50A of ABS resin having good heating resistance and low-temperature resistance, and a protective case 50B. The base 50A has a groove 50C to engage the attachment 5a (not shown) when it is secured to the cable clamp 7, and it is integrated with the protective case 50B by being screwed up thereto to form the watertight section 50D inside them. A sealing member 52 to prevent water etc. from invading the watertight section 50D is inserted to the junction between the base 50A and the protective case 50B.

Included in the watertight section 50D are: a lithium battery 110 as power source; the wireless communication section 60 on which semiconductor circuit units for conducting the temperature history recording operation and the wireless communication with outside are mounted, its substrate surface being positioned in the direction vertical to the power supplying direction; a conductive member 53 that electrically connects the wireless communication section to the negative electrode of the lithium battery 110; a conductive member 54 that electrically connects the wireless communication section to the positive electrode of the lithium battery 110; a supporting member 55 that secures the conductive member 53 inside the watertight section 50D; a separating member 57 that supports the conductive member 53 and a ground terminal 59 to isolate them each other; and a sealing member 56 that prevents water from invading the watertight section 50D through the separating member 57. The conductive member 54 is positioned by a supporting member 52 such that it contacts the positive electrode of the battery 110.

The wireless communication section 60 includes: a semiconductor device 61 for wireless communication operation; a substrate 62 on which a wiring pattern is formed, the substrate serving to transmit/receive radio wave as an antenna in the wireless communication operation; a semiconductor device (power supplying unit) 70 that controls power supplied to the wireless communication section 60; and a semiconductor device (main controller) 80 that controls the temperature history recording operation and the wireless communication with outside. The wireless communication section 60 is positioned by the supporting member 52 such that it vertically stands in the watertight section 50D.

The base 50A accommodates detachably a temperature history recording unit 40 that includes lithium battery 44, a semiconductor chip 45, a circuit board 47 etc. in an opening at the bottom. The temperature history recording unit 40 is electrically connected to the wireless communication section 60 being inside the watertight section 50D through a spring-shaped signal input/output terminal 58 and the ground terminal 59 provided in the opening. Furthermore, an insulating member 48 of a material such as silicon with good thermal conductivity is inserted between the temperature history recording unit 40 and the cable clamp 7. In this embodiment, the dimension of the protective case 50B is 35 mm in width, 35 mm in depth and 20 mm in height.

FIGS. 5(a) and (b) show the temperature history recording unit 40. The temperature history recording unit 40 is called "button-type cool memory" which is a product being merchandised by the applicant. The temperature history recording unit 40 includes: outside its metal case of stainless etc., a signal input/output section 41 at the top; a cylindrical ground terminal 42 at the side; and a flange 43 composing a thermometric surface at the bottom; and inside the metal case, the lithium battery 44 that supplies power to the circuits; the semiconductor chip 45 that includes a temperature sensor to detect temperature; and the circuit board 47 that has the semiconductor chip 45 fixedly mounted thereon with a bump 46 of solder etc. The circuit pattern forming surface of the semiconductor chip 45 is placed facing the circuit board 47.

The temperature sensor uses a PN-junction type diode for temperature detection, which detects the temperature of cable clamp 7 based on a comparison between the forward voltage and the reference voltage. A sealing member 49 is provided between the signal input/output section 41 and the ground terminal 42 to give a watertight structure. Also, a spacer (not shown) of resin is provided inside the metal case to fill the interior space. The outer diameter of the temperature history recording unit 40 is about 17 mm.

Figure 6:
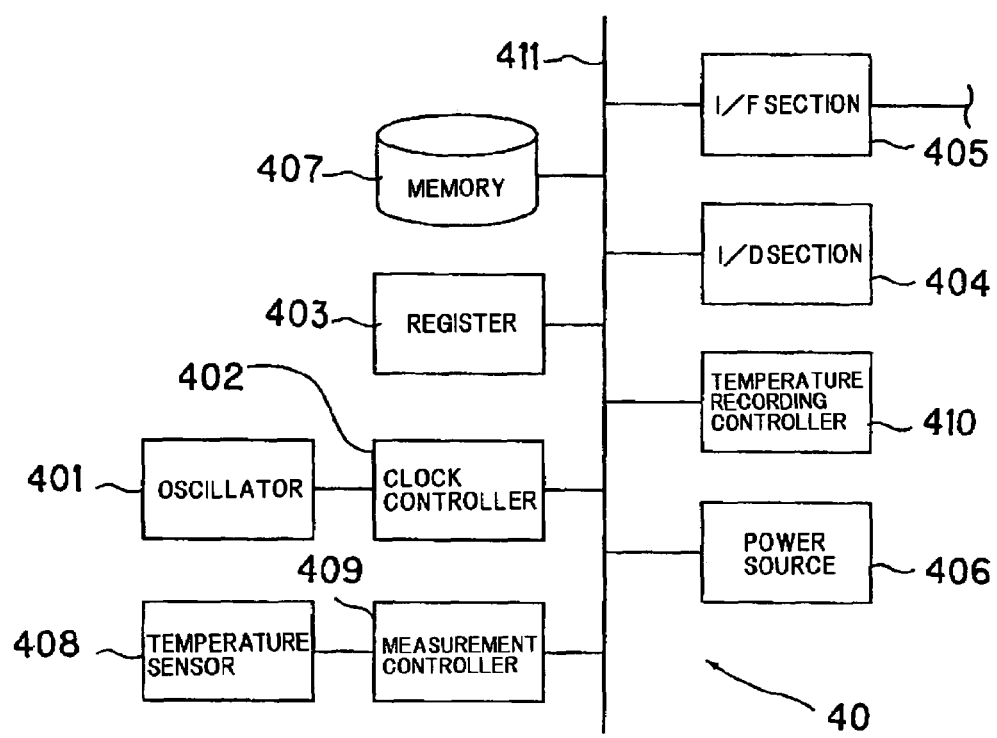
FIG. 6 is a circuit diagram, showing the temperature history recording unit 40 in the preferred embodiment of the invention.

FIG. 6 shows a circuit composition of the temperature history recording unit 40. It is composed of: a clock controller 402 that controls a clock function inside the circuit based on a reference clock outputted from an oscillator 401; a register 403 that temporarily stores clock data outputted from the clock controller 402; an ID section 404 that stores 64-bit serial number uniquely assigned to the temperature history recording unit 40; an interface (I/F) section 405 that controls the data input/output between the wireless communication section 60 and the main controller 80; a power source 406, such as a lithium battery, that supplies power to the circuit; a memory 407 that stores various programs for temperature history recording operation, temperature history record outputting operation etc. and arbitrary data; a temperature sensor 408 that outputs a temperature detection signal according to temperature; a measurement controller 409 that outputs A/D converted temperature detection signal together with the output of the clock controller 402 to the memory 407; a temperature recording controller 410 that controls the respective sections, and an internal bus 411 that gives connections between the above components.

Figure 7:
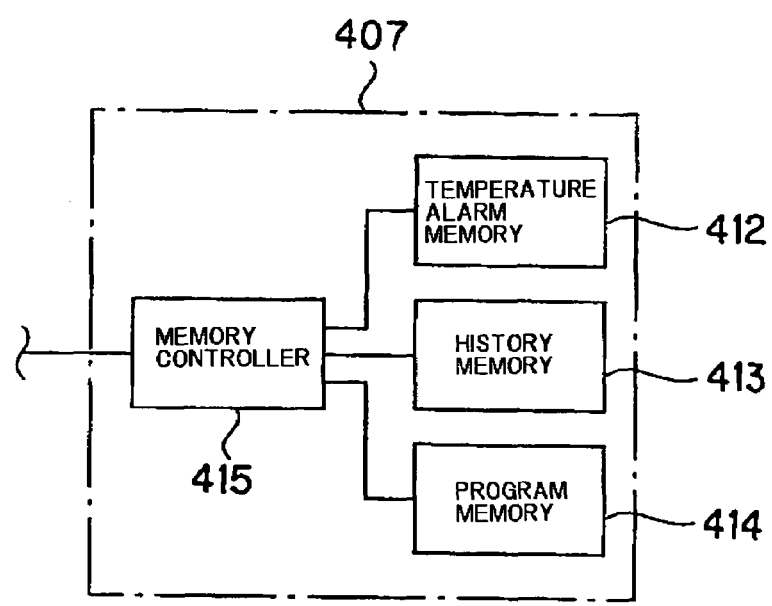
FIG. 7 is a circuit diagram showing a memory 407 of the temperature history recording unit 40 in the preferred embodiment of the invention.

FIG. 7 shows a composition of the memory 407. It is composed of: a temperature alarming memory 412 that stores temperature and measurement time, as a temperature alarming record, when the cable clamp 7 reaches a high temperature exceeding a permissible temperature range; a history memory 413 that stores, as a history, a temperature record based on conditions of temperature measurement, other data and measurements of temperature to be inputted at predetermined measurement intervals from the start of measurement; a program memory 414 that stores various programs; and a memory controller 415 that controls the writing and reading into/from the respective memories. If the history memory 413 lacks a memory area due to the accumulation of temperature history record data etc., then the storing of temperature data is stopped by means of the conditions of measurement or oldest data is deleted and latest data is stored.

FIG. 8(*a*) shows controlling blocks of the temperature monitor 5A where the main controller 80 controls the temperature history recording unit 40, wireless communication section 60 and power supplying section 70.

The main controller 80 includes an interface (I/F) (not shown), by which it can be connected to a terminal device such as personal computer to which data necessary to the initial setting etc. are inputted. Also, according to a read request signal inputted to the terminal device, a temperature history recording data are outputted from the temperature history recording unit 40.

The power supplying section 70 supplies suitable power from a battery 110 according to a power supply signal outputted from the main controller 80 in temperature recording operation, communication operation and non-operating standby. Also, it outputs the value of remaining power of the battery when the main controller 80 requests to send the remaining power of the battery 110.

The temperature history recording unit 40 conducts temperature recoding and temperature history recording based on initial setting, e.g. a measurement time interval, temperature alarm setting by which a temperature history when sensing extraordinary heating is stored as a temperature alarm record, and a time period not to conduct the temperature measurement, to be inputted by the terminal device being connected through the interface to the main controller 80 before being locally installed. Also, it outputs a transmit request signal for temperature alarm record to the main controller 80 when getting the temperature alarm record of the cable clamp 7.

FIG. 8(*b*) shows a signal transmission system between the temperature monitor 5A and the external monitoring device 101. The temperature monitor 5A encodes the temperature history record data obtained based on the measurement of temperature at the cable clamp 7, and then transmits it to a receiving unit 90 placed near a switch using radio wave in a frequency band of 315 MHz.

The receiving unit 90 electro-optically converts the received temperature history recording data and transmits it through an optical fiber 100 to the monitoring device 101. The monitoring device 101 is, for example, a personal computer equipped with a keyboard, a recording medium, a display, CD-ROM etc. and analyzes the transmitted temperature history recoding data to get a temperature of the cable clamp 7, a measurement time, and a temperature change.

On the other hand, the setting of temperature history recording operation can be, if necessary, changed by transmitting a signal for various setting values from the monitoring device 101 to the receiving unit 90 and then wirelessly transmitting the setting value from the receiving unit 90 to the temperature monitor 5A. Although in FIG. 8(*b*) the receiving unit 90 is shown such that it wirelessly communicates with the single temperature monitor 5A, it may wirelessly communicate with multiple temperature monitors 5A.

The operation of the temperature monitoring system for electric power-applied section of the invention is explained below in reference to the drawings.

[1] Input of Initial Setting Values

An operator conducts the input operation while connecting the terminal device through the interface to the main controller 80 of the temperature monitor 5A to initialize the temperature monitor 5A. The initializing operation can be conducted by, e.g., the monitoring device 101. In initializing, the main controller 80 reads a serial number stored in the ID section 404 of the temperature history recording unit 40. After the initializing, the terminal device is used to input the initial setting values of: an alarm temperature at the temperature history recording unit 40; a first measurement interval (e.g., one hour) in normal operation; a time period of measurement; conditions of alarm temperature (e.g., higher than 50° C., lower than −1° C.), a communication interval with the receiving unit 90 (e.g., once a half a day); a communication protocol etc. Also, the linkage to an ID uniquely assigned to the receiving unit 90 to be communicated with is set up. The main controller 80 stores these initial setting values to the built-in memory (not shown).

After the initial setting, an on-site worker attaches the insulating member 48 to thermometric surface of the temperature history recording unit 40 by using an adhesive etc. Then, the worker places the temperature monitor 5A on the surface of the cable clamp 7. He positions it such that the insulating member 48 equally contacts the surface of the cable clamp 7, then fixing the temperature monitor 5A thereto by using the attachment 5a. The on-site worker, after completing the installing work, requests a test communication to an operator to operate the monitoring device 101, so that a serial number request signal is outputted from the monitoring device 101. The receiving unit 90 transmits radio wave based on the serial number request signal to be sent through the optical fiber 100 from the monitoring device 101. When the main controller 80 receives the serial number request signal, it reads out the serial number stored in the memory and then transmits it to the receiving unit 90. The receiving unit 90 receives radio wave based on the received serial number and electro-optically converts it, and then sends it through the optical fiber to the monitoring device 101. The operator confirms whether or not the serial number received by the monitoring device 101 corresponds to the temperature monitor 5A to be communicated with. Thus, by communicating with the monitoring device 101, it is confirmed whether or not the interference and communication trouble occur.

[2] Temperature History Recoding Operation

The temperature history recording unit 40 conducts the measurement of temperature at the cable clamp 7 at first time intervals based on the initial setting value. The temperature history recording unit 40 detects the temperature of the cable clamp 7 to be conducted from the surface of the cable clamp 7 through the insulating member 48 to the thermometric surface of the temperature history recording unit 40 by the temperature sensor 408. The temperature detected is converted to an electrical signal according to the temperature by the measurement controller 409 and sequentially stored into the history memory 413 of the memory 407. The time data to be outputted from the clock controller 402 is simultaneously stored as the measurement time. The power supplying section 70 supplies power needed to conduct the measuring and recording operations of temperature and, after completing these operations, supplies power in the standby mode with a small consumption power from the battery 110.

[3] Transmission of Temperature History Record

The main controller 80 controls the wireless communication section 60 to send the temperature history record to the receiving unit 90 at communication intervals according to the initial setting value. In the wireless communication, the serial number of the temperature history recording unit 40 is sent to the receiving unit 90. Subsequently, the temperature history record being stored in the history memory 413 is sequentially sent through radio wave. The receiving unit 90 electro-optically converts the received wave based on the temperature history record, sending its signal light through the optical fiber cable 100 to the monitoring device 101. The monitoring device 101 photo-electrically converts the received signal light to analyze the temperature history record.

FIGS. 9(*a*) and (*b*) show the communication operation between the receiving unit 90 and the temperature monitors 5A, 5B, 5C, 5D, 5E and 5F.

FIG. 9(*a*) shows the transmit request operation from the receiving unit 90. The receiving unit 90 photo-electrically converts the light signal received through the optical fiber cables 100A and 100B, sending it through radio wave.

FIG. 9(*b*) shows the transmit operation of temperature history record from the respective temperature monitors. The main controller 80 of the respective temperature monitors requests the temperature history recording unit 40 to output the temperature history record according to the transmit request signal to be sent from the wireless communication section 60. The temperature history record is transmitted through radio wave to the receiving unit 90 in the order shown in FIG. 9(*b*). The receiving unit 90 electro-optically converts the received radio wave into signal light, sending it through the optical fiber cables 100A and 100B to the monitoring device 101. The monitoring device 101 receives the signal light and photo-electrically converts it, thereby analyzing the temperature history record concerning the cable clamp 7.

[4] Transmission of Temperature Alarm Record

When the cable clamp 7 reaches a high temperature exceeding a permissible temperature range, the temperature history recording unit 40 stores that temperature and measurement time as a temperature alarm record into the temperature alarm memory 421 of the memory 407 and outputs a transmit request signal of temperature alarm record to the main controller 80. The main controller 80 controls the wireless communication section 60 according to the transmit request signal to send the temperature alarm record to the receiving unit 90.

Functions and effects obtained in the abovementioned embodiment of the invention are as follows.

(1) The lithium battery 110, wireless communication section 60, power supplying section etc. are housed in the protective case 50B of the temperature monitor 5A. Therefore, the temperature of cable clamp 7 can be accurately recorded without being influenced by an environment change such as temperature and humidity.

(2) In attaching the temperature monitor 5A to the cable clamp 7, the thermometric surface of the temperature history recording unit 40 only has to be in contact with the measured object. Therefore, another fixing member (e.g., a simple fixing member such as adhesive tape) other than the attachment 5a may be used. Furthermore, a fixing means using adhesion and magnetic force may be employed. The work time and cost required for the fixing can be reduced.

(3) The temperature history recording unit 40 is installed through the opening formed at the bottom of the temperature monitor 5A. Also, the thermometric surface of the temperature history recording unit 40 securely contacts the cable clamp 7 by means of the spring force of signal input/output terminal 58 and ground terminal 59. Therefore, even when a low-frequency vibration occurs due to AC power transmission, a stable detection of temperature can be performed since the thermometric surface of the temperature history recording unit 40 securely contacts the surface of cable clamp 7.

(4) The temperature and measurement time regarding the cable clamp 7 are in time-series stored in the memory 407 of the temperature history recording unit 40. When the temperature alarm record is obtained, it is rapidly transmitted to the receiving unit 90. Thus, the occurrence of extraordinary temperature in the cable clamp 7 can be rapidly known on the monitor side. On the other hand, when the temperature of cable clamp 7 is in the normal range of temperature, the transmit cycles of temperature history record to the receiving unit 90 may be once a day or so. In this case, the consumed power can be reduced.

(5) The insulating member 48 with an excellent thermal conductivity is laid between the temperature history recording unit 40 and the cable clamp 7. Thus, temperature can be equally conducted from the cable clamp 7 to the thermometric surface of the temperature history recording unit 40. This prevents an inaccuracy in temperature detection from occurring due to the dispersion of temperature on the thermometric surface. Furthermore, the direct contact between the temperature history recording unit 40 and the cable clamp 7 can prevent a corrosion due to voltage difference. The insulating member 48 may be of film type to be adhered by adhesive etc. or paste type.

(6) With respect to the wireless communication section 60 being housed in the protective case 50B of the temperature monitor 5A, the surface of substrate 62 is placed in the direction vertical to the power supplying direction. This prevents a voltage difference from occurring on the same substrate under high-field conditions. Therefore, noise to be superposed in transmitting the temperature history record data can be suppressed. This stabilizes the wireless communication of temperature history record as well as enhancing the reliability of wireless communication.

(7) Due to employing the semiconductor type temperature sensor in the temperature history recording unit 40, the consumed power required to measure the temperature can be reduced. The life of battery as power source can be extended that much. Also, the device size can be reduced since a smaller battery is available. When the consumption of battery is remarkable, it is assumed that there is a significant increase in temperature at a position where the temperature monitor is placed due to some trouble of the section with cable clamp attached or power transmission line. In this case, it is desirable to conduct the maintenance check as soon as possible.

In the above embodiment, the temperature history record is outputted from the temperature monitor 5A by means of transmitting it through radio wave. Alternatively, the temperature monitor 5A may be removed from the electric power-applied section and then connected to a read device (not shown), thereby outputting the temperature history record through the interface 405 to an external device. In this case, the monitoring of temperature can be continued for a long time since the power of battery is not consumed for wireless communication.

Furthermore, in the embodiment of the invention, the temperature monitor is used to measure the temperature of cable clamp. It may be used to measure the temperature of a switch or bus bar in DC transformer station, main circuit connection of transformer station etc., non-conductive member such as insulator.

As described above, in the temperature monitoring system of the invention, the temperature history based on the temperature and measurement time of electric power-applied section is recorded by the temperature history recoding means. Therefore, the temperature history can be obtained according to the situation of a measured object. The monitoring of temperature can be thus conducted safely and not costly without limiting the measured object.

INDUSTRIAL APPLICABILITY

The temperature monitoring system of the invention is suitable to be used for such a measured object that the on-site worker is subjected to a danger or difficulty in monitoring the temperature due to high altitude, high voltage and high field.

What is claimed is:

1. A temperature monitoring system for an electric power-applied section, comprising:
    a temperature history recording means for measuring a temperature of said electric power-applied section and recording said temperature as a temperature history together with its measurement time; and
    a control means for controlling the recording and a transmitting operation of said temperature history at a first predetermined interval,
    wherein said temperature history recording means comprises:
        a temperature sensor that generates a temperature detection signal according to said temperature;
        a memory that stores, as said temperature history, a measured temperature and a measurement time based on said temperature detection signal; and
        a housing comprising a watertight circuit housing portion being formed to make a thermometric surface of said temperature sensor contact a measured object,
    wherein said memory comprises:
        a history memory that stores, in a time series, said temperature history; and
        a temperature alarm memory that stores, in a time series, as a temperature alarm, a temperature history being out of a range of a normal temperature, and
    wherein:
        said control means controls said temperature history recording means to conduct a recording operation of the temperature history at a second predetermined time interval that is shorter than said first predetermined time interval when a temperature history is stored in said temperature alarm memory.

2. A temperature monitor comprising:
    a temperature sensor that generates a temperature signal based upon a detected temperature;
    a transmitter; and
    a controller that controls the temperature sensor to generate said temperature signal and that controls said transmitter to transmit said temperature signal along with a time signal at a first predetermined interval, wherein said controller controls said transmitter to transmit said temperature signal and said time signal at a second predetermined time interval that is shorter than said first predetermined interval if said temperature signal indicates that said detected temperature is outside of a predetermined temperature range.

3. The monitor of claim 2, wherein the controller controls said transmitter to further transmit a temperature alarm signal if said temperature signal indicates that said detected temperature is outside of a predetermined temperature range.

* * * * *